F. R. JONES.
FRICTION CLUTCH.
APPLICATION FILED MAY 23, 1912.
1,126,779.
Patented Feb. 2, 1915.
2 SHEETS—SHEET 1.
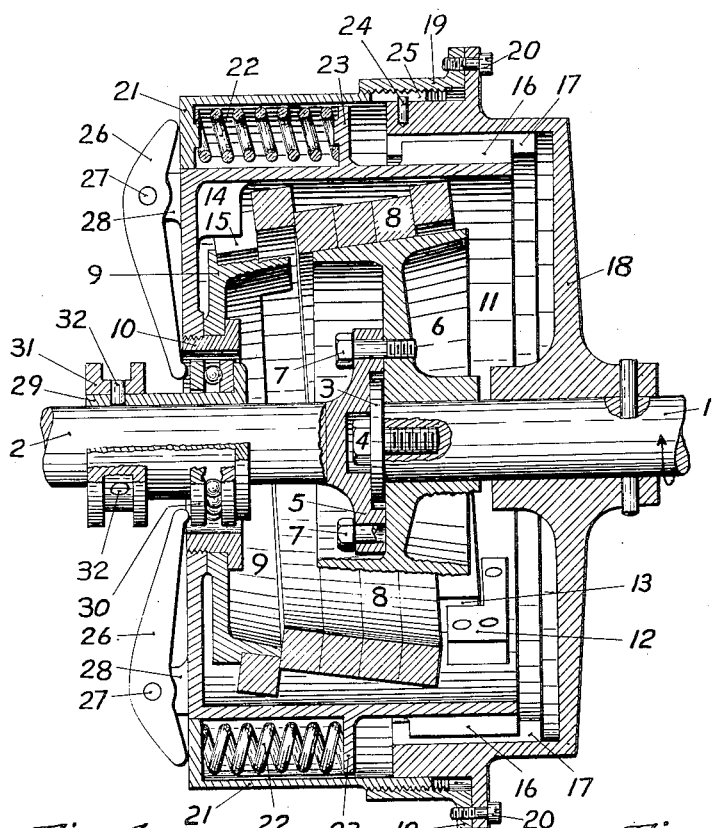
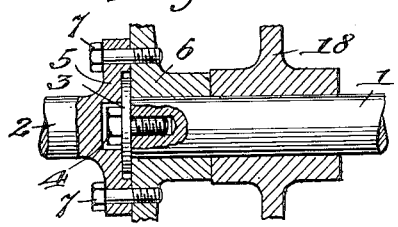
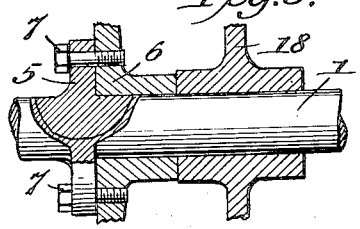
WITNESSES
INVENTOR
Forrest R. Jones.

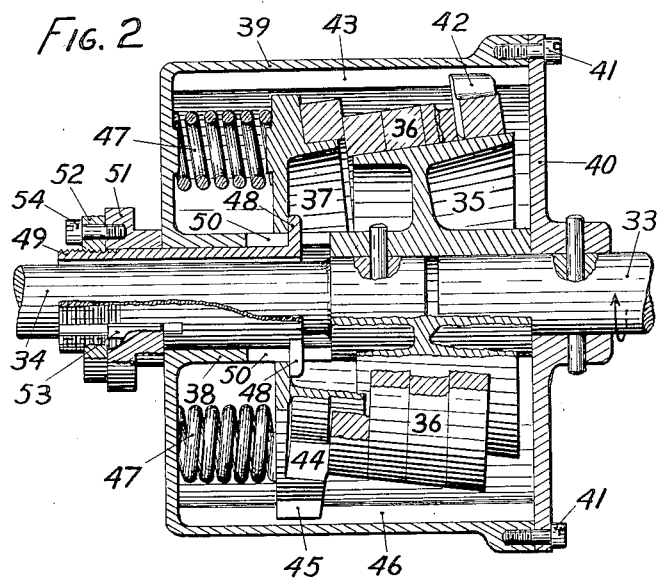
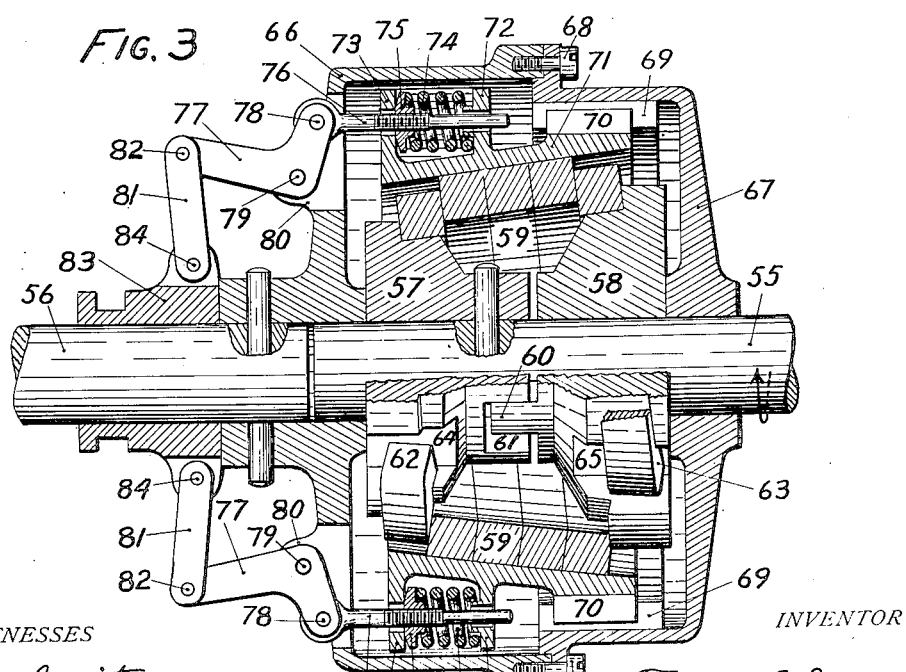

UNITED STATES PATENT OFFICE.

FORREST R. JONES, OF KNOXVILLE, TENNESSEE.

FRICTION-CLUTCH.

1,126,779. Specification of Letters Patent. Patented Feb. 2, 1915.

Application filed May 23, 1912. Serial No. 699,349.

*To all whom it may concern:*

Be it known that I, FORREST R. JONES, a citizen of the United States, residing at 1702 Melrose Place, in the city of Knoxville, county of Knox, and State of Tennessee, have invented new and useful Improvements in Friction-Clutches, of which the following is a specification.

My invention relates especially to friction clutches and similar torque transmitting devices in which a coiled friction member is used.

The object of my invention is to provide a device embodying the above feature, and in which the driving and driven shafts, or corresponding members, need not be moved longitudinally relative to each other during the operation of putting the friction members into engagement with each other and of disengaging them from each other, and which device, by evident modifications, can be used upon a continuous shaft.

Each of the devices of this application embodies a friction coil, a coil-mount, and the torque-limiting feature described in my application which has been given Serial Number 503,383 and filing date of June 21, 1909.

Similar reference numbers refer to similar parts in the drawings.

Figure 1 shows the device in one of its forms in which the friction cone is inside of the friction coil. The figure is mostly a longitudinal section, but some of the members are shown in full view or in partly full view, and, above the shaft, a portion of the member 9 is broken away back of the sectional plane in order to show adjacent parts. Similarly, a portion of the member 6 is broken away below the shaft. Fig. 2 is another form of the device with the friction cone inside of the friction coil. The view is mostly that of a longitudinal section, but some of the members are shown in partly full view, and a small portion of the friction coil is broken away back of the sectional plane. Fig. 3 is a form of the device in which a hollow friction cone is outside of the friction coil. Most of the view is a longitudinal section, but some of the members are shown in full view, or in partly full view. Figs. 4 and 5 are modified forms of Fig. 1.

In Fig. 1, the shafts 1 and 2 are coaxial, and either can drive the other in either direction of rotation. The flat ring 3 is fastened to 1 by means of the bolt 4. Shaft 2 has a flange 5 and is doubly recessed at the flanged end to receive the ring 3 and the head of the bolt 4. A friction cone 6 is fastened to the flange 5 by means of bolts 7. The hub of 6 is bored to fit rotatively on shaft 1. One end of the hub of 6, and the bottom of the shallower part of the recess in shaft 2, together form an annular space whose sides bear against the sides of the ring 3 to prevent longitudinal movement, or end motion, of the shafts relative to each other; the friction cone is thus also restricted against end motion relative to the shafts. The friction coil 8 engages the external surface of the cone 6. Coil 8 is supported by the coil-mount 9, which is in turn rotatively supported by the externally-flanged ring 10 threaded into the flanged end of the inclosing cylindrical shell 11. A stop-block 12 is riveted to the inner wall of 11 so as to act as an abutment for the end 13 of the bar of the friction coil. The stop-lug 14, an integral part of 11, acts as an abutment for the end 15 of the coil-bar. On the outside of 11 are longitudinal feather keys, or tongues, 16, which fit into corresponding grooves 17 in the interior of the cylindrical flange of the head 18, rigidly connected to shaft 1. The shell 11 can therefore be moved longitudinally, but not rotatively, relative to 18. When 11 is moved longitudinally, it carries with it the coil-mount 9 and the friction coil 8. To the radial flange which is part of 18, is fastened an angle ring 19 by means of the screws 20. The inside of 19 is threaded to the internally-flanged casing 21, whose flange forms an abutment for one end of each of the coiled compression springs 22. The other abutment for these springs is the flange 23, an integral part of 11. The expansive action of the compression springs 22 forces the friction coil 8 into engagement with the friction cone 6, since the friction coil must move longitudinally with 11. Rotation of 21 relative to 18 is prevented by means of the pin 24, fitted into a hole in 18 and into a longitudinal slot, or notch, 25 in 21.

The movement of 11, in the direction to engage the friction members with each other, is limited to the extent which causes the levers 26 to bear against both the end of the flanged casing 21 and the end of the ring 10. Each of the levers 26 is connected, by means of its hinge-pin 27, to a corresponding lug 28 that is part of 11.

For releasing the engagement of the friction members, the flanged sleeve 29, freely movable on shaft 2, the ball bearing 30, and the grooved collar 31, are provided; 29 and 31 are rigidly fastened together by the pins 32. When the group 29—30—31—32 is moved in the longitudinal direction away from the flanged end of shaft 2, the inner ends of the levers 26 are carried along with said group on account of the pressure of one of the race-rings of the ball bearing against the levers, the outer end of each lever meanwhile pressing against the end of the casing 21. The lugs 28, the member 11, and the friction coil 8 are thus moved in the same direction as that of the group 29—30—31—32, thereby disengaging the friction coil from the cone.

When torque is applied to the shaft 1 in the direction indicated by the curved arrow on the shaft, the path of transmission of the torque is from 1 to 18, through 18 to grooves 17, thence to tongues 16 on 11, through 11 to the lug 14 and the end 15 of the bar of the friction coil 8, then through the friction coil to the friction cone 6, and from the friction cone to the shaft 2. If torque is applied to shaft 1 in the direction opposite that indicated by the curved arrow, then the path of transmission in 11 is from the tongues 16 to the stop-block 12, and thence to the end 13 of the bar of the friction coil; otherwise the path of transmission is the same as just described.

In order to obtain complete disengagement of the friction members from each other by a minimum movement of one friction member relative to the other, the coil is held permanently stressed by the members which retain it in position. In order to keep the conical friction surface of the coil coaxial with the shell 11 while the coil is not engaged with the friction cone, part of a turn of the coil at the large end of the coil is wound to a diameter greater than that which conforms to the conical friction surface of the middle turns, so that the curvature of part of the outside of this end turn is substantially the same as that of the inside of the shell 11. The bar of the coil is made of such a length that, in order to put the coil in place, the coil must be unwound enough to stress it to substantially the same intensity that the transmission of the maximum torque to be transmitted will stress it. The coil is held thus permanently stressed and with its friction surface coaxial with the shell by the combined action of the members 9, 11, 12 and 14, the relative curvatures of the shell and the enlarged part of a turn at the large end of the coil being such as to retain the coil coaxial with the aid of the coil-mount. The coil being thus kept permanently enlarged beyond its unstressed form, only a slight movement is required to completely disengage it from the friction cone after the cone and coil have been completely engaged with each other. At the small end of the friction coil, the part turn which fits on the coil-mount is enlarged diametrally in order to permit the friction cone to clear the flange of the mount when the cone enters in under this flange.

Adjustment of the device so that it will limit the transmitted torque to a desired maximum amount that is not appreciably varied by variation in the coefficient of friction between the friction members, can be made by removing the screws 20 and then screwing the threaded angle ring 19 along the casing 21 to the position corresponding to the desired amount of maximum torque, then putting the screws 20 in place again so as to hold the parts in the positions shown.

Referring to Fig. 2, either of the coaxial shafts 33 and 34 can drive the other in either direction of rotation. The friction cone 35 is rigidly connected to shaft 34. The friction coil 36 engages with the outer surface of 35, and is supported by the coil-mount 37, which is held coaxial with the shaft by means of the tubular inner portion 38 of the casing 39. The casing 39 is fastened to the driving head 40 by means of screws 41, and 40 is rigidly fastened to the shaft 33. One end of the friction coil has the form of an outwardly projecting hook 42 that extends into a longitudinal groove 43 in the inner wall of the casing 39. The other end of the friction coil abuts against the shoulder 44 on the coil-mount 37. From the main body of the coil-mount 37, the lug 45 projects radially outward into the groove 46 of the casing 39. The grooves 43 and 46 are wide enough to allow the hook-end 42 of the friction coil, and the lug 45, to move through a fraction of a revolution in their respective groove. Each of the coiled compression springs 47 abuts at one end against the end wall of the casing 39, and the opposite end of each spring abuts against the coil-mount 37. The tendency of these springs to become longer forces the friction coil into engagement with the friction cone.

The extent of the movement of the friction coil, in the direction to engage with the friction cone, is limited by the hooks 48, which are part of the member 49 and extend radially outward from the tubular portion of 49 through longitudinal slots 50 in the end of 38. The tubular portion of 49 fits freely inside of 38, so that 49 can move longitudinally in 38, but rotation of 49 relative to 38 is prevented by the arms 48 and the slots 50. The extent of the longitudinal movement of 48—49 relative to 38—39 is limited to the amount which causes one end of the shouldered collar 51 to bear against the end of the casing 39. The ring-nut 52, threaded on 49, prevents the collar 51 from sliding along 49 in the direction toward the threaded end of 49. The key 53 prevents rotation of 51 relative to 49, and the lock-screw 54 prevents rotation of the nut 52 relative to the collar 51 and to the member 48—49.

To disengage the friction members of the device from each other, the collar 51 can be forced longitudinally away from the end of the casing 39, which will also move the member 48—49, the coil-mount 37, and the friction coil 36, in the same direction, thus disengaging the friction coil from the friction cone. One end of the hub of the friction cone 35 abuts against the head 40, and the opposite end of the hub abuts against the slotted end of 38. This construction prevents, or limits, longitudinal movement of the shafts 33 and 34 relative to each other, and of the friction cone relative to the shafts.

When torque is applied to the shaft 33 in the direction indicated by the curved arrow, the path of transmission of the torque is from 33 to the head 40, through the screws 41 to the casing 39, then from the casing to the coil-mount 37 by means of the groove 46 and the lug 45, from the coil-mount to the friction coil 36, thence to the friction cone 35, and on through the cone to the shaft 34. When torque is applied to the shaft 33 in the direction opposite that indicated by the curved arrow, the transmission from the casing to the friction coil is from the side of the groove 43 to the end 43 of the friction coil. No torque is transmitted through the coil-mount under this condition of operation.

To adjust the device to limit the transmitted torque to a predetermined amount, the lock-screw 54 can be removed, and the nut 52 then screwed along 49 to the position corresponding to the predetermined maximum amount of torque to be transmitted.

In Fig. 3, 55 and 56 are two coaxial shafts either of which can drive the other in either direction of rotation. On 55 are mounted the two members 57 and 58, which together form a coil-mount for the friction coil 59. The member 57 is rigidly fastened to the shaft 55, and 58 is loosely mounted on 55, but a tongue, or jaw, 60 on 58, projects into recess 61 in 57, so that 58 can rotate through only part of a revolution relative to 57 and 55; the recess is wider circumferentially than the jaw in order to allow such rotative movement. The ends 62 and 63 of the friction coil, are bent inward and hook into corresponding notches 64 and 65, in 57 and 58 respectively. The notch 64 is wider circumferentially than the hooked end of the bar, thus permitting circumferential movement of the hook in the notch. The two parts, 66 and 67, of the hollow cylindrical casing, are fastened together by screws 68. The part 66 is rigidly fastened to the shaft 56, and the part 67 has a free rotative fit on the shaft 55. The member 67 has internal longitudinal grooves 69 into which fit tongues, or feather keys, 70, that are integral with the hollow friction member 71, whose inner surface is conical and engages with the outer surface of the friction coil. The flanges 72 and 73 are also integral parts of 71. Between the latter two flanges are coiled compression springs 74. One end of each of these compression springs abuts against the flange 72, and the opposite end of each spring abuts against a corresponding flanged nut 75, which is threaded on the eye-bolt 76 corresponding to said nut. Each of the eye-bolts 76 has a free fit in holes in the flanges 72 and 73, and is connected to a corresponding bent lever 77 by means of one of the hinge-pins 78. Each bent lever 77 is also connected, by means of its own hinge-pin 79, to a corresponding lug 80 on the member 66, and to one of the links 81 by means of one of the hinge-pins 82. Each of the links 81 is also connected to the sliding sleeve, or collar, 83, by means of one of the hinge-pins 84. The group of members, 74 to 84 inclusive, comprises the mechanism for forcing the friction members 59 and 71 into engagement with each other, and for disengaging the friction members from each other. By sliding the sleeve 83 in the direction away from the body of the device, and far enough to draw the joints at the hinge-pins 82 well in toward the shaft 56, the friction members are caused to disengage from each other. Then, by sliding the sleeve 83 back to the position shown, the friction members are again forced into engagement. If no torque is being transmitted during the time the friction members are thus forced into engagement, the end-thrust of the eye-bolts 76 compresses the springs 74, and consequently the flanged nuts 75 are moved away from contact with the flange 73. This action occurs because more force is required to push the friction cone over the coil while no torque is being transmitted than while torque is transmitted. As soon as torque is applied up to the maximum amount to which the device automatically limits itself, the compression springs expand and force the coil over the cone to an extent which is limited by the flanged nuts 75 striking against the flange 73. When these nuts arrive at the position shown in the figure the condition just stated exists. The construction shown prevents end movement of the shafts 55 and 56 relative to each other.

The path of transmission of torque, when torque is applied to the shaft 55 in the direction indicated by the curved arrow, is from 55 to 57, then from 57 to the friction coil 59 by means of one side of the notch 64 bearing against the inner side of the hook 62, thence from the friction coil to the cone 71, through the cone to the part 67 of the casing by means of the tongues 70 and grooves 69, and then through the casing to the shaft 56. When torque is applied to the shaft 55 in the direction opposite that indicated by the curved arrow, the path of transmission is from 55 to 57, then from 57 to 58 by means of the notch 61 and jaw 60, then from 58 to the friction coil by means of the notch 65 and the hook 63. The remainder of the path of transmission is the same as has just been described.

Adjustment to a predetermined maximum amount of torque to which the device automatically limits itself, can be made by removing the hinge-pins 78 and then screwing the eye-bolts 76 through their respective flange-nuts 75, then putting the hinge-pins in place again.

In the modified form of Fig. 1 shown in Fig. 4, the shaft 1 has a running fit in the hub of 18, and the pin which fastens these two members together in Fig. 1 is omitted in Fig. 4, thus leaving the head 18 free to rotate on the shaft 1. The only function of shaft 1 relative to head 18, in the modified form, Fig. 4, is to keep the head concentric with the friction cone 6. In the modified form, Fig. 4, it is immaterial, so far as operation is concerned, whether the hub of cone 6 has a running fit on shaft 1, as required in Fig. 1, or is rigid with shaft 1. Rigid fastening together of shaft 1 and cone 6 is preferable for constructional reasons, since this rigid construction permits simplification by merging shafts 1 and 2 into one continuous shaft as in Fig. 5, thus eliminating the ring 3 and bolt 4 of Fig. 4.

I claim:

1. The combination comprising a driving shaft and a driven shaft coaxial and not movable longitudinally relative to each other, a friction coil which has a conical friction surface, a mount for said coil, means through which said driving shaft can drive said coil rotatively, a friction cone, means through which said cone can drive said driven shaft rotatively, means for causing the engagement of said friction members with each other and for disengaging them, and means to positively limit the movement of said friction members relative to each other in a direction to increase their pressure against each other.

2. In combination, a friction coil whose middle turns are wound to form a conical friction surface and which has part of one turn at each end wound to a curvature different from that conforming to said conical surface, a mount for said coil, a shell around said coil, means connecting said shell and said mount together rotatively, means through which said shell can drive said coil rotatively, means for driving said shell rotatively, a shaft, a friction cone rigidly attached to said shaft, and means for causing engagement of said cone and said coil.

3. In combination, a shaft, a friction cone rigidly attached to said shaft, a friction coil whose middle turns are wound to form a conical surface and which has part of one turn at each end wound to a curvature different from that conforming to said conical surface, a mount for said coil, a shell around said coil, means connecting said shell and said mount together rotatively, means through which said shell can drive said coil rotatively, a head, means through which said head can drive said shell rotatively, means supporting said head concentric with said cone, and means for causing engagement of said cone and said coil.

4. In combination, a friction coil whose middle turns are wound to form a conical surface and which has part of a turn at each end wound to a curvature different from that conforming to said conical surface, a mount for said coil, a shell around said coil, means connecting said shell and said mount together rotatively, means through which said shell can drive said coil rotatively, means for driving said shell rotatively, a shaft, a friction cone rigidly attached to said shaft, means for causing engagement of said cone and said coil, and means to positively limit the movement of said cone and said coil relative to each other in a direction to increase their pressure against each other.

5. In combination, a shaft, a friction cone rigidly attached to said shaft, a friction coil whose middle turns are wound to form a conical surface and which has part of a turn at each end wound to a curvature different from that conforming to said conical surface, a mount for said coil, a shell around said coil, means connecting said shell and said mount together rotatively, means through which said shell can drive said coil rotatively, a head, means through which said head can drive said shell rotatively, means supporting said head concentric with said cone, means for causing engagement of said cone and said coil, and means to positively limit the movement of said cone and said coil relative to each other in a direction to increase their pressure against each other.

Signed this twenty-first day of May, 1912, in the presence of two witnesses.

FORREST R. JONES.

Witnesses:
CHAS. A. PERKINS,
J. A. SWITZER.